United States Patent
Ishigami et al.

(10) Patent No.: US 9,870,754 B2
(45) Date of Patent: Jan. 16, 2018

(54) COMPUTER PROGRAM PRODUCT, INFORMATION PROCESSING METHOD, AND INFORMATION PROCESSING APPARATUS

(71) Applicants: Masanori Ishigami, Tokyo (JP); Yoshinaga Kato, Kanagawa (JP)

(72) Inventors: Masanori Ishigami, Tokyo (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 4 days.

(21) Appl. No.: 14/182,929

(22) Filed: Feb. 18, 2014

(65) Prior Publication Data

US 2014/0266978 A1    Sep. 18, 2014

(30) Foreign Application Priority Data

Mar. 13, 2013  (JP) .................................. 2013-051067

(51) Int. Cl.
*G09G 5/14* (2006.01)
*G06F 3/14* (2006.01)

(52) U.S. Cl.
CPC .............. *G09G 5/14* (2013.01); *G06F 3/1423* (2013.01); *G09G 2340/045* (2013.01); *G09G 2340/0407* (2013.01); *G09G 2370/042* (2013.01); *G09G 2370/10* (2013.01)

(58) Field of Classification Search
None
See application file for complete search history.

(56) References Cited

U.S. PATENT DOCUMENTS

| | | | |
|---|---|---|---|
| 8,013,805 B2 * | 9/2011 | Piazza | G06F 3/1454 345/1.1 |
| 2004/0212610 A1* | 10/2004 | Hamlin | G06F 3/1423 345/211 |
| 2009/0096713 A1 | 4/2009 | Kim et al. | |
| 2009/0160883 A1 | 6/2009 | Sonobe | |
| 2009/0165059 A1* | 6/2009 | Seki | G06F 3/0219 725/80 |

(Continued)

FOREIGN PATENT DOCUMENTS

| | | |
|---|---|---|
| JP | 05-002379 | 1/1993 |
| JP | 11-168686 | 6/1999 |

(Continued)

OTHER PUBLICATIONS

Extended European Search Report issued on Jun. 12, 2014 in the corresponding European Patent Application No. 14156799.0.

*Primary Examiner* — Duane N Taylor, Jr.
(74) *Attorney, Agent, or Firm* — Oblon, McClelland, Maier & Neustadt, L.L.P.

(57) ABSTRACT

A computer program product includes a non-transitory computer-readable medium containing an information processing program. The program causes a computer to perform: detecting a connection state of an external monitor that is externally connected to the computer and is different from an internal monitor of the computer; switching display monitor between the internal monitor and the external monitor based on the detected connection state; and controlling a display screen according to a screen specification of the internal monitor or the external monitor that is the display monitor thus switched.

11 Claims, 8 Drawing Sheets

(56) References Cited

U.S. PATENT DOCUMENTS

| | | |
|---|---|---|
| 2009/0219441 A1 | 9/2009 | Kurita |
| 2010/0164839 A1* | 7/2010 | Lyons et al. ................... 345/2.3 |
| 2010/0192091 A1 | 7/2010 | Oishi et al. |
| 2012/0200571 A1 | 8/2012 | Newell |
| 2012/0274656 A1 | 11/2012 | Kang et al. |
| 2012/0287343 A1 | 11/2012 | Kelly et al. |
| 2013/0308055 A1 | 11/2013 | Shigemasa et al. |
| 2013/0312085 A1 | 11/2013 | Shigemasa et al. |
| 2014/0125554 A1* | 5/2014 | Pan et al. ....................... 345/2.2 |

FOREIGN PATENT DOCUMENTS

| | | |
|---|---|---|
| JP | 2001-024976 | 1/2001 |
| JP | 2005-025000 | 1/2005 |
| JP | 2012-237964 | 12/2012 |
| JP | 2013-225833 | 10/2013 |
| JP | 2013-242357 | 12/2013 |
| JP | 2013-242632 | 12/2013 |

* cited by examiner

COMPUTER PROGRAM PRODUCT, INFORMATION PROCESSING METHOD, AND INFORMATION PROCESSING APPARATUS

CROSS-REFERENCE TO RELATED APPLICATIONS

The present application claims priority to and incorporates by reference the entire contents of Japanese Patent Application No. 2013-051067 filed in Japan on Mar. 13, 2013.

BACKGROUND OF THE INVENTION

1. Field of the Invention

The present invention relates to a computer program product, an information processing method, and an information processing apparatus.

2. Description of the Related Art

A conference system using information processing apparatuses having a built-in display unit has heretofore been known. Such a system may use externally-connected display units (hereinafter, referred to as "external monitors") different from the splay units built in the information processing apparatuses (hereinafter, referred to as "internal monitors"). In such a case, the monitors are switched for use. The monitors may be switched in cases such as the following: for example, a case when an external monitor having a display area different from that of an internal monitor is connected to an information processing apparatus; and a case when an external monitor having resolution different from that of an internal monitor is connected to an information processing apparatus.

For example, Japanese Patent Application Laid-open No. 2001-24976 discloses a technique for determining whether an external device having a similar function to that of a built-in device is connected, and if the built-in and external devices mutually have similar functions, enabling the operation of the external device instead of the built-in device.

However, the conventional technique cannot flexibly cope with the switching of the monitors. For example, if the monitors are switched, measures such as changing a size and resolution of a display image need to be taken according to screen specifications of the switched monitor. According to the conventional technique, such measures will not be taken. This can lower the visibility of a display screen when the conference system or the like provides services.

Therefore, there is a need to improve the visibility of the display screen.

SUMMARY OF THE INVENTION

According to an embodiment, a computer program product includes a non-transitory computer-readable medium containing an information processing program. The program causes a computer to perform: detecting a connection state of an external monitor that is externally connected to the computer and is different from an internal monitor of the computer; switching display monitor between the internal monitor and the external monitor based on the detected connection state; and controlling a display screen according to a screen specification of the internal monitor or the external monitor that is the display monitor thus switched.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, an embodiment will be described in detail with reference to the accompanying drawings.

System Configuration

Figure 1:
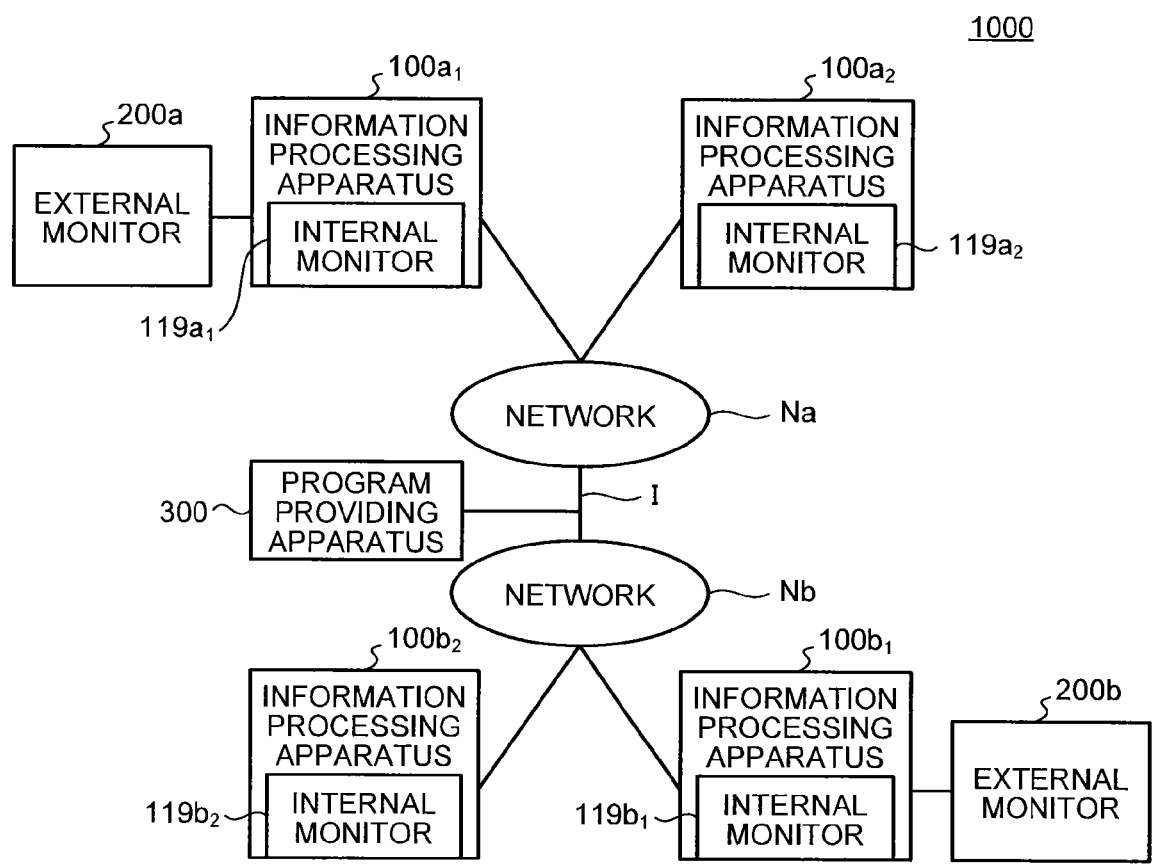
FIG. 1 is a diagram illustrating a configuration example of an information processing system according to a first embodiment.

FIG. 1 is a diagram illustrating a configuration example of an information processing system 1000 according to the present embodiment. FIG. 1 illustrates an example of a conference system using a plurality of information processing apparatuses $100a_1$, $100a_2$, $100b_1$, and $100b_2$. The information processing apparatuses $100a_1$ and $100a_2$ are connected to an internal network Na. The information processing apparatuses $100b_1$ and $100b_2$ are connected to an internal network Nb. The networks Na and Nb (which may hereinafter be referred to collectively as "networks N") correspond to, for example, a LAN (local area network) and the like. The networks N are connected to an external network I. As employed herein, the external network I corresponds to, for example, a WAN (wide area network), the Internet, and the like. Consequently, in the information processing system 1000 according to the present embodiment, the information processing apparatuses $100a_1$ and $100a_2$ and the information processing apparatuses $100b_1$ and $100b_2$ can perform data communication via the external network I. In the information processing system 1000 according to the present embodiment, a program providing apparatus 300 is connected to the external network I. The program providing apparatus 300 provides programs to the information processing apparatuses $100a_1$, $100a_2$, $100b_1$, and $100b_2$, for example, via the external network I.

As illustrated in FIG. 1, the information processing apparatuses $100a_1$, $100a_2$, $100b_1$, and $100b_2$ according to the present embodiment include internal monitors $119a_1$, $119a_2$, $119b_1$, and $119b_2$, respectively. The information processing apparatuses $100a_1$, $100a_2$, $100b_1$, and $100b_2$ may hereinafter be referred to collectively as "information processing apparatuses 100." The internal monitors 119$a_1$, 119$a_2$, 119$b_1$, and 119$b_2$ may hereinafter be referred to collectively as "internal monitors 119."

The information processing apparatuses 100$a_1$ and 100$b_1$ are further equipped with external monitors 200$a$ and 200$b$ which have screen specifications (such as "the size of the display area" and "resolution") different from those of the internal monitors 119$a_1$ and 119$b_1$. The external monitors 200$a$ and 200$b$ may hereinafter be referred to correctively as "external monitors 200."

The information processing apparatuses 100 according to the present embodiment are apparatuses having a display control function. The information processing apparatuses 100 perform display control for switching a display monitor between an internal monitor 119 and an external monitor 200. The information processing apparatuses 100 correspond to, for example, PCs (personal computers), dedicated conference terminals, smartphones, tablet terminals, mobile phones, projectors, and the like. The internal monitors 119 and the external monitors 200 are display units, and display various images such as moving images and still images. If the information processing apparatuses 100 are projectors, the projection surfaces, such as screens, for projected images to be displayed on correspond to the internal monitors 119.

With the foregoing system configuration, the information processing system 1000 according to the present embodiment can provide conference services such as the following. For example, the information processing system 1000 issues a connection request (conference participation request) from the information processing apparatus 100$a_1$ connected to the network Na to the information processing apparatus 100$a_2$ connected to the same network Na. The information processing system 1000 also issues a connection request (conference participation request) from the information processing apparatus 100$a_1$ connected to the network Na to the information processing apparatuses 100$b_1$ and 100$b_2$ connected to the network Nb via the external network I. The information processing apparatuses 100$a_2$, 100$b_1$, and 100$b_2$ respond to the connection requests (send conference participation agreement), whereby bidirectional data communication is established between the information processing apparatuses 100$a_1$, 100$a_2$, 100$b_1$, and 100$b_2$. By such a call control, the information processing system 1000 starts to provide conference services by bidirectional communications using various contents such as text, images (including still images and moving images), and voices. Here, the internal monitors 119 included in the information processing apparatuses 100 display image contents such as video images of conference participants and conference materials. At this time, if the external monitor 200 is connected to the information processing apparatuses 100, the display monitor is switched from the internal monitor 119 to the external monitor 200, and the image contents are displayed on the external monitor 200.

Examples of the method for the foregoing call control include (1) SIP (Session Initiation Protocol) and (2) H.323. Examples of the method for the foregoing call control further include (3) extended protocols of SIP and (4) protocols of instant messengers. Examples of the method for the foregoing call control further include (5) protocols using a MESSAGE method of SIP and (6) protocols of Internet relay chat (IRC). Examples of the method for the foregoing call control further include (7) protocols obtained by extending the protocols of instant messengers. Of these, (4) the protocols of instant messengers are ones used, for example, in (4-1) XMPP (Extensible Messaging and Presence Protocol), (4-2) ICQ (registered trademark), and the like. Examples of (4) the protocols of instant messengers further include protocols used in AIM (registered trademark) and Skype (registered trademark). Examples of (7) the protocols obtained by extending the protocols of instant messengers include Jingle.

For example, H.264/AVC and H.264/SVC may be used as an image coding method. Other coding methods may be used.

The call control between the information processing apparatuses 100 may be performed, for example, via a call control server. The data communications between the information processing apparatuses 100 may be performed via a relay apparatus which relays various contents.

Hardware Configuration

Figure 2:
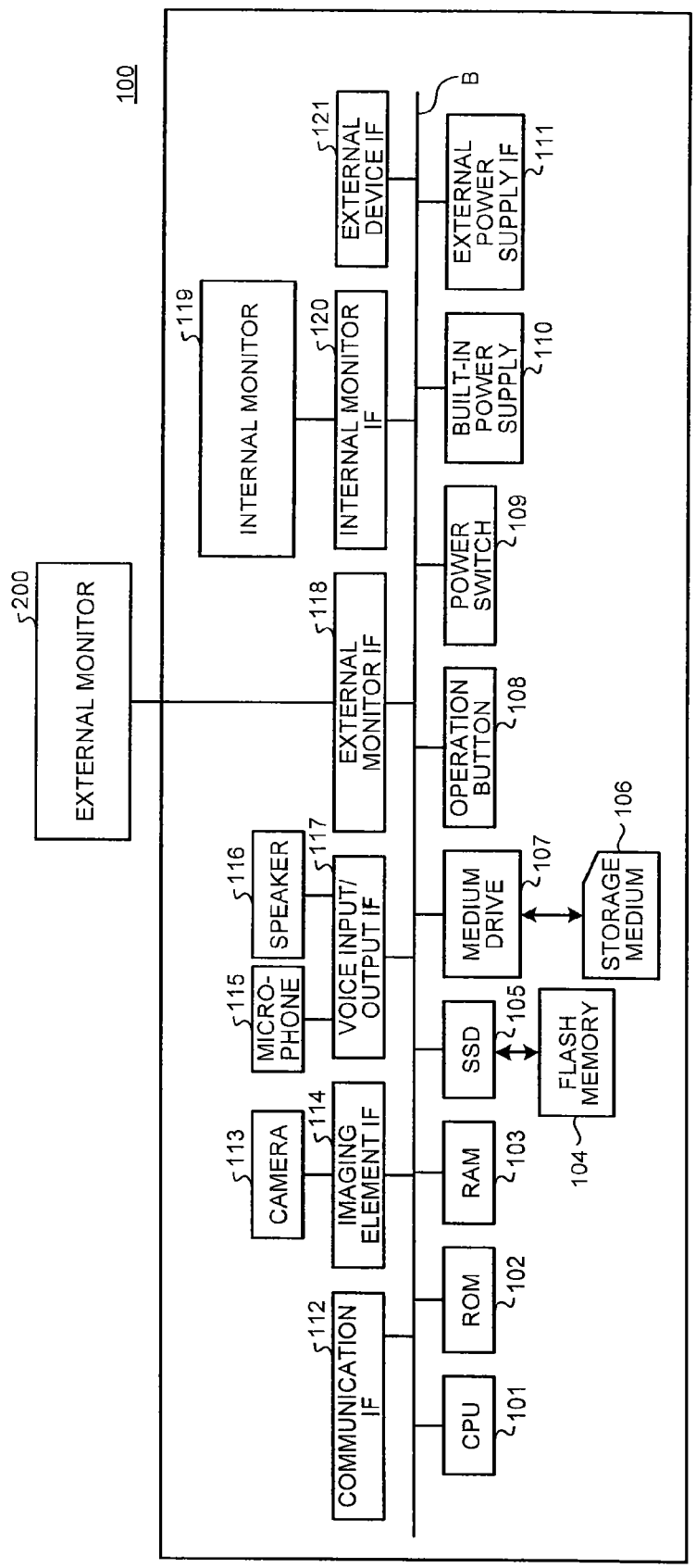
FIG. 2 is a diagram illustrating a hardware configuration example of an information processing apparatus according to the first embodiment.

FIG. 2 is a diagram illustrating a hardware configuration example of an information processing apparatus 100 according to the present embodiment. As illustrated in FIG. 2, the information processing apparatus 100 according to the present embodiment includes a CPU (Central Processing Unit) 101. The information processing apparatus 100 also includes a ROM (Read Only Memory) 102 and a RAM (Random Access Memory) 103. The information processing apparatus 100 also includes a flash memory 104, an SSD (Solid State Drive) 105, and a medium drive 107. The information processing apparatus 100 also includes an operation button 108, a power switch 109, a built-in power supply 110, and an external power supply IF 111. The information processing apparatus 100 also includes a communication IF 112, a camera 113, an imaging element IF 114, a microphone 115, a speaker 116, and a voice input/output IF 117. The information processing apparatus 100 also includes an external monitor IF 118, the internal monitor 119, an internal monitor IF 120, and an external device IF 121. In the information processing apparatus 100, the foregoing components are connected to each other via a bus B.

The CPU 101 is an arithmetic unit that controls the entire apparatus. The ROM 102 is a nonvolatile semiconductor memory which can retain internal data even when powered off. For example, the ROM 102 contains a program to be executed upon activation of the information processing apparatus 100 and data. The RAM 103 is a volatile semiconductor memory. The CPU 101 is an arithmetic unit that controls the entire apparatus and implements installed functions, for example, by reading programs and data from the ROM 102 into the RAM 103 and performing processing.

The flash memory 104 is a nonvolatile semiconductor memory such as a flash EEPROM (Electrically Erasable Programmable ROM) and a flash ROM. The SSD 105 reads and writes data from/to the flash memory 104. The medium drive 107 reads and writes data from/to a storage medium 106. Examples of the storage medium 106 include recording media such as a flexible disk, a CD (Compact Disk), a DVD (Digital Versatile Disk), and a memory card.

The operation button 108 is a UI (User Interface) that is used to input respective operation signals to the apparatus. The power switch 109 turns on/off power supply to the apparatus. The built-in power supply 110 is a power supply that supplies driving power from inside, not from outside the apparatus. Examples of the built-in power supply 110 include a storage battery. The external power supply IF 111 is an interface between a power supply that supplies driving power from outside the apparatus and the information processing apparatus 100. For example, if the external power supply comes from an outlet, a plug corresponds to the external power supply IF 111.

The communication IF 112 is an interface that connects the apparatus to a predetermined data transmission path such as a network N. The camera 113 includes an optical system engine such as a lens. The camera 113 captures an image by receiving incident light with an imaging element. The imaging element IF 114 is an interface that performs data transmission and reception between various optical system devices, such as the camera 113, and the information processing apparatus 100. The microphone 115 detects sound, for example, by using a sensor and the like. The speaker 116 outputs sound, for example, by reproducing data on detected sound and predetermined voice contents. The voice input/output IF 117 is an interface that performs data transmission and reception between various voice input/output devices, such as the microphone 115 and the speaker 116, and the information processing apparatus 100.

The external monitor IF 118 and the internal monitor IF 120 are interfaces that perform data transmission and reception between the external and internal monitors 200 and 119 and the information processing apparatus 100. For example, the external monitor 200 and the internal monitor 119 are liquid crystal displays. The external monitor 200 and the internal monitor 119 display the result of processing by the information processing apparatus 100. The external device IF 121 is an interface that performs data transmission and reception between various external devices, such as a PC, smartphone, tablet terminal, and mobile phone, and the information processing apparatus 100. An external storage device such as a HDD (Hard Disk Drive) and a micro drive can be connected to the external device IF 121.

As described above, the information processing system 1000 according to the present embodiment can use the foregoing configuration to provide conference services by bidirectional communications using various contents between remote sites (for example, "between different network areas").

Display Control Function

The display control function according to the present embodiment will be described. The information processing apparatus 100 according to the present embodiment detects a connection state of the external monitor 200. The information processing apparatus 100 switches a display monitor between the internal monitor 119 and the external monitor 200 based on the detected connection state, and controls a display screen according to the screen specifications of the display monitor thus switched. At this time, the information processing apparatus 100 resizes a display image and sets the resolution of the display, etc. The information processing apparatus 100 according to the present embodiment has such a display control function.

The conventional technique cannot flexibly cope with the switching of the display monitor between different display units. The display monitor may be switched in cases such as the following. For example, the display monitor may be switched when an external monitor 200 having a display area and resolution different from those of the internal monitor 119 is connected to the information processing apparatus 100. In such a case, the information processing apparatus 100 needs to take measures such as changing the size and resolution of the display image according to the screen specifications of the display monitor to be used.

Figure 3:
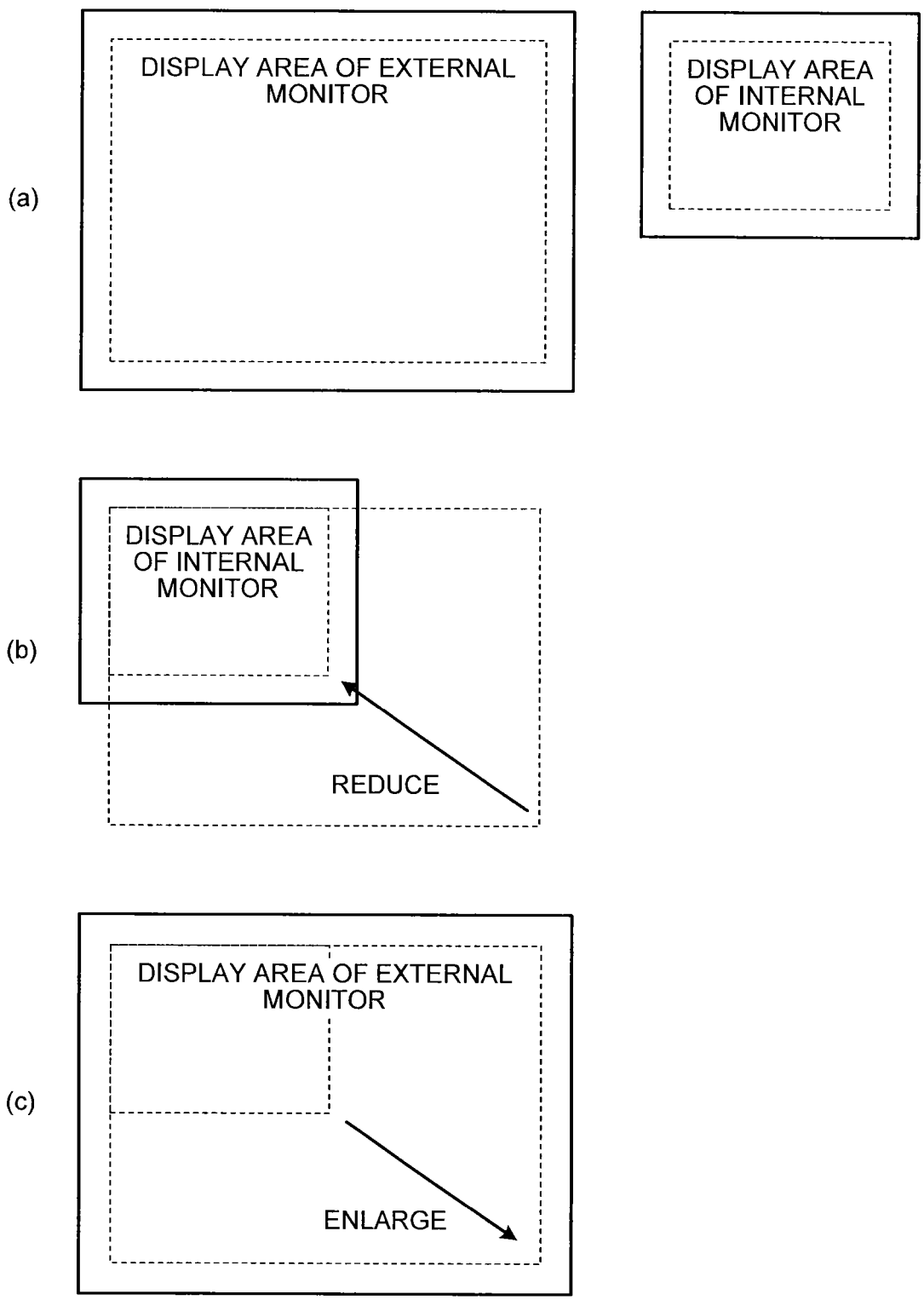
FIG. 3 is a diagram illustrating examples of measures to cope with display screens having different display areas according to the first embodiment.

FIG. 3 is diagram illustrating examples of measures to cope with display screens having different display areas according to the present embodiment. Section (a) of FIG. 3 illustrates an example of an internal monitor 119 and an external monitor 200 having different display areas. Sections (b) and (c) of FIG. 3 illustrate examples of the measures to cope with the display screens when the display monitor to be used is switched between the internal monitor 119 and the external monitor 200.

Section (b) of FIG. 3 illustrates an example of the measures when switching from the external monitor 200 having a display area larger than that of the internal monitor 119 to the internal monitor 119. To display an image suitable for the display monitor, the display image having been displayed on the external monitor 200 before switching needs to be reduced and resized to a proper size for the display area according to the screen specifications of the internal monitor 119.

In contrast, section (c) of FIG. 3 illustrates an example of the measures when switching from the internal monitor 119 having a display area smaller than that of the external monitor 200 to the external monitor 200. To display an image suitable for the display monitor, the display image having been displayed on the internal monitor 119 before switching needs to be enlarged and resized to a proper size for the display area according to the screen specifications of the external monitor 200.

According to the conventional technique, such switching of the display monitor is not supported, and an image fails to be properly displayed on the switched display screen. This reduces visibility. Examples of the phenomenon that an image fails to be properly displayed on the display screen include that the image is too large to be in the display area (is displayed beyond the display area) because of the mismatched display area. Another example is that the image is displayed small with respect to the display area (is displayed to one side, leaving margins in the display area). Examples of the phenomenon that an image fails to be properly displayed on the display screen also include that the image quality of the display image decreases due to mismatched resolution.

To offer the conference services described in conjunction with FIG. 1, the following point needs to be taken into account. Initially, a specific scene where the conference services are used will be described to clarify the point. For example, in the conference services, the information processing apparatuses 100 in the own location and the information processing apparatuses 100 in other location display the same images during the conference. Here, an information processing apparatus 100 in the own location transmits, for example, image data on conference materials stored in the apparatus to the other information processing apparatus 100 in the own location and the information processing apparatuses 100 in the other location. As a result, the same images are displayed on the information processing apparatuses 100 in the own location and the information processing apparatuses 100 in the other location.

Consequently, the images of the same conference materials can be viewed in the own location and the other location. This enables smooth communication. The own location corresponds to a conference venue where one is. The other location corresponds to a conference venue where other conference participants are. In other words, the conference venue where one is and the conference venue where other conference participants are different places.

In such a use scene, image data is usually generated according to a predetermined format (for example, including "size" and "resolution") common to the information processing apparatuses 100 in the own location and the information processing apparatuses 100 in the other location. While transmitting the image data to the information processing apparatuses 100 in the other location, the information processing apparatuses 100 in the own location display the same image. Here, the information processing apparatuses 100 in the own location need to resize the same image data as the transmission data to an appropriate size according to the display screens in the own location. In the use scene of the conference services, such a point needs to be taken into account in order to provide an environment for smooth communication.

In view of this, the display control function according to the present embodiment includes detecting the connection state of an external monitor 200 and controlling a display screen according to the screen specification of the display monitor thus switched based on the detected connection state.

The display control function according to the present embodiment thereby provides an environment capable of switching a display monitor to be used between different monitors. As a result, the display control function according to the present embodiment can improve the visibility of the display screen.

Figure 4:
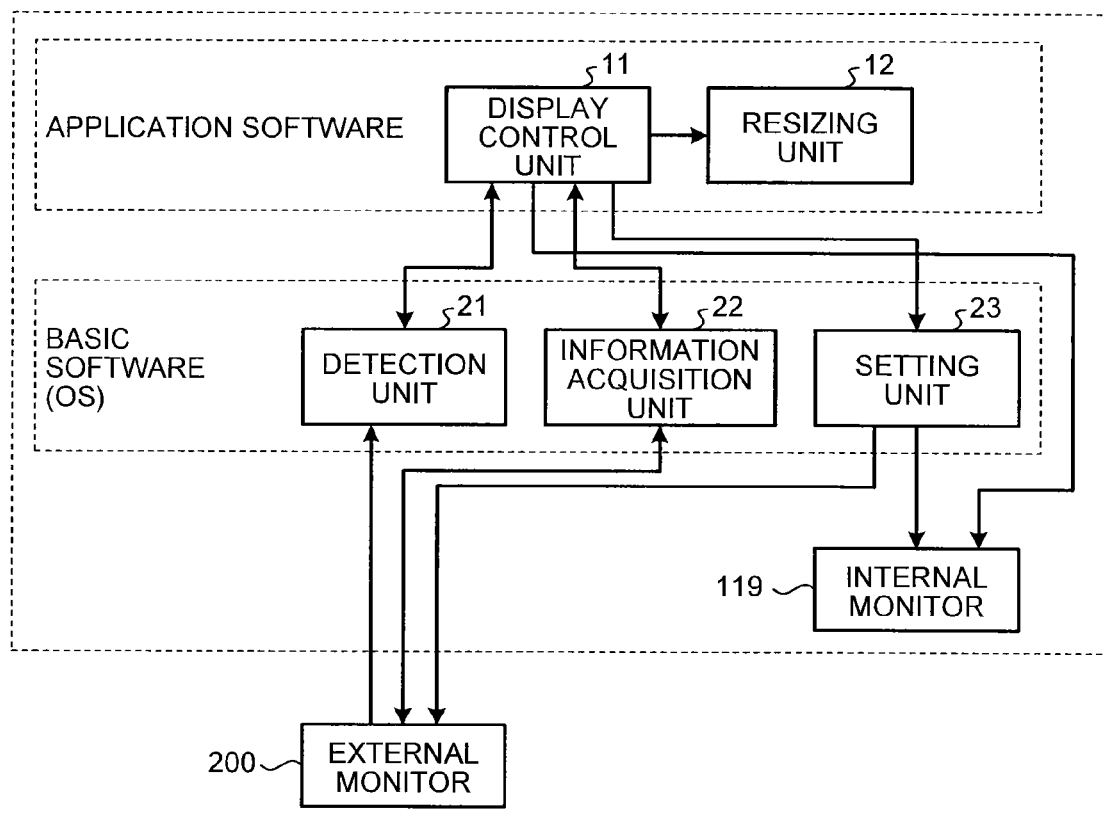
FIG. 4 is a diagram illustrating a configuration example of a display control function according to the first embodiment.

A configuration and operation of the display control function according to the present embodiment will be described below. FIG. 4 is a diagram illustrating a configuration example of the display control function according to the present embodiment. As illustrated in FIG. 4, the display control function according to the present embodiment includes a display control unit 11, a resizing unit 12, a detection unit 21, an information acquisition unit 22, and a setting unit 23. In the present embodiment, the respective functions of the display control unit 11 and the resizing unit 12 are implemented, for example, by application software such as a program installed in the information processing apparatus 100. In the present embodiment, the respective functions of the detection unit 21, the information acquisition unit 22, and the setting unit 23 are implemented, for example, by basic software such as an OS (Operating System) mounted on the information processing apparatus 100. In other words, the display control function according to the present embodiment is implemented by the cooperation of the basic software and the application software running on the basic software.

The display control unit 11 controls the display screen according to the screen specification of the display monitor to be used, based on a state change of the information processing apparatus 100 detected by the detection unit 21. If the display control unit 11 receives an event notification about the detection result from the detection unit 21, the display control unit 11 requests the information acquisition unit 22 to inquire a device state of the external monitor 200. The display control unit 11 receives a response about the device state (receives state information about the external monitor 200). Consequently, the display control unit 11 switches the display monitor between the internal monitor 119 and the external monitor 200 based on the received state response.

If the external monitor 200 is in a displayable state, the display control unit 11 turns off the internal monitor 119 and instructs the resizing unit 12 to resize the display image according to the screen specification of the external monitor 200. For example, the display control unit 11 gives an instruction to turn off the internal monitor 119 via an API (Application Program Interface) intended for display drive control which the basic software has (by calling an API function). The display control unit 11 notifies the resizing unit 12 that the display image needs to be resized, for example, by using an event or registry notification. Such an event or registry notification may be issued, for example, by assigning a resizing notification to a predetermined keyboard event or setting a value indicating a resizing notification into a predetermined registry value. The display control unit 11 issues a resizing notification to the resizing unit 12 by the foregoing method, for example, via an API intended for an event or registry notification which the basic software has. If the external monitor 200 is not in a displayable state, the display control unit 11 turns on the internal monitor 119 and issues no resizing notification to the resizing unit 12.

If the external monitor 200 is in a displayable state, the display control unit 11 requests the information acquisition unit 22 to inquire device performance of the external monitor 200. The display control unit 11 receives a response about the device performance (receives performance information about the external monitor 200). Based on the received device performance response, the display control unit 11 instructs the setting unit 23 to set resolution according to the screen specification of the external monitor 200. The display control unit 11 passes a value of resolution included in the received device performance response to the setting unit 23, and instructs the setting unit 23 to set the resolution. If the external monitor 20 is not in a displayable state, the display control unit 11 gives an instruction to set resolution according to the screen specification of the internal monitor 119.

The resizing unit 12 resizes the display image according to the screen specification of the display monitor. The resizing unit 12 initially identifies a display area before switching (height: H1, width: W1) and a display area after switching (height: H2, width: W2) based on the specifications of the display areas of various preset displays. The resizing unit 12 thereby determines a magnification ratio (enlargement ratio or reduction ratio) of the display image based on the ratio in size between the identified display areas (height ratio: H2/H1, width ratio: W2/W1).

The resizing unit 12 may store magnification ratios of a display image determined in advance for respective possible switching patterns of the display monitor based on the respective screen specifications of the internal monitor 119 included in the information processing apparatus 100 and external monitors 200 connectable to the information processing apparatus 100. For example, if the magnification ratio of the display image displayed on the external monitor 200 is set to 1, the magnification ratio of the display area displayed on the internal monitor 119 having a display area smaller than that of the external monitor 200 may be set to 0.85. In such a case, the resizing unit 12 stores the values, 1 and 0.85, of the respective magnification ratios. With the respective magnification ratios thus stored, the resizing unit 12 identifies a switching pattern of the display monitor (whether from the internal monitor 119 to the external monitor 200 or from the external monitor 200 to the internal monitor 119). Consequently, based on the identification result, the resizing unit 12 obtains the magnification ratio corresponding to the switching pattern of the display monitor from among the plurality of magnification ratios stored. This allows the resizing unit 12 to resize the display image even if the display control unit 11 fails to obtain device information including screen specification from the external monitor 200 via the information acquisition unit 22.

Next, the resizing unit 12 resizes the display image before switching based on the determined magnification ratio or the obtained magnification ratio. The resizing unit 12 performs the resizing by generating display data in a predetermined data format processable by an UI function (display screen drawing function) of the display monitor. The resizing unit 12 generates the display data for resizing the display image according to the data format processable by the UI function of the display monitor. Examples of languages of such a data format include HTML (HyperText Markup Language) and CSS (Cascading Style Sheets). The resizing unit 12 generates the display data by embedding the image data on the display image (display image data) and setting the value of the magnification ratio as a parameter value of image resizing processing according to the language specifications of the data format. If the language of the data format is HTML, the image data may be embedded, for example, by using a defined tag such as an image tag. The parameter value of the image resizing processing may be set, for example, by setting the value of the magnification ratio, i.e., the enlargement ratio or reduction ratio as an attribute value of transform:scale( ) or the like. As a result, the display data is processed by the UI function mounted on the side of the display monitor, whereby the display data is drawn on the display screen based on the processing result. The display image itself is thus displayed on the display screen as enlarged or reduced according to the set magnification ratio.

Note that the foregoing display image may include image data generated by the information processing apparatus 100 and image data stored in advance. The foregoing display image may also include image data received from another information processing apparatus 100 via the communication IF 112 and image data received from an external device connected via the external device IF 121.

In a use scene of the conference services, an information processing apparatus 100 in the own location initially generates image data on a display image according to a predetermined format. Next, the information processing apparatus 100 in the own location functions as a transmission unit, and transmits the generated image data to an information processing apparatus 100 in another location. Here, the resizing unit 12 included in the information processing apparatus 100 in the own location performs resizing processing when the apparatus displays the same image after the transmission of the image data or before the transmission of the image data. Here, the resizing unit 12 resizes the display image having the same contents as those of the image data to transmit, thereby changing the size (image size).

As described above, in the present embodiment, the internal monitor 119 and the external monitor 200 use the common UI function to resize the display image. This eliminates the need to take independent measures (generate display data) for the respective displays. In other words, according to the present embodiment, the display image can be resized by using the display data common to the internal monitor 119 and the external monitor 200. This can simplify the resizing processing and reduce the processing load.

The detection unit 21 detects a state change of the information processing apparatus 100 upon activation or after activation. State changes to be detected include a change in the state whether the external monitor 200 is connected or not. Specifically, state changes to be detected include a state change occurring when the external monitor 200 is connected to the information processing apparatus 100 and a state change occurring when the external monitor 200 is detached (disconnected) from the information processing apparatus 100. For example, the detection unit 21 detects a state change of the information processing apparatus 100 based on a signal input via the external monitor IF 118 (input signal from the external monitor 200), and issues an event notification about the detection result to the display control unit 11. As described above, such an event notification may be issued, for example, by using an event function of the basic software, or alternatively, by defining an original event and using an extended event function.

Specific scenes that the present embodiment assumes where a state change occurs upon activation or after activation include the following, for example: a case when the information processing apparatus 100 is activated with the external monitor 200 connected, and a case when the information processing apparatus 100 is activated without the external monitor 200 connected. Examples also include a case when the external monitor 200 is connected after the activation of the information processing apparatus 100, and a case when the external monitor 200 is detached after the activation of the information processing apparatus 100.

The information acquisition unit 22 obtains various types of information from the external monitor 200 according to a request from the display control unit 11. The information acquisition unit 22 inquires of the external monitor 200 about a device state via the external monitor IF 118, and obtains, for example, state information indicating a displayable state or a not-displayable state. The information acquisition unit 22 also inquires of the external monitor 200 about device performance via the external monitor IF 118, and obtains performance information including resolution. Examples of the performance information to obtain here include general-purpose data indicating hardware performance which is held in advance in the display unit for the purpose of connection with various devices. The information acquisition unit 22 passes the obtained information to the requesting display control unit 11.

Now, the general-purpose data, which is an example of the performance information to be obtained by the information acquisition unit 22, will be briefly described. A display implements plug-and-play (automatic detection and automatic connection) with a connected device. In general, to connect a PC and a display, a video signal output from the PC needs to fall within the range of frequencies and resolution supported by the display. The frequencies include the horizontal and vertical scanning frequencies and the clock frequency of the video signal. The resolution refers to hardware performance of the horizontal and vertical dot configuration. To implement plug-and-play, the PC needs to obtain such information from the display in some way. In view of this, EDID (Extended Display Identification Data) is provided as general-purpose data that enables connection with various devices. EDID is 128-byte binary data describing characteristics specific to the display, such as supported frequencies, resolution, manufacturer name (Vendor ID), and model (Product ID). EDID is stored in a storage unit in the display. EDID may include extension blocks beyond 128 bytes depending on the characteristics of the display.

The setting unit 23 sets the resolution of the display monitor according to a request from the display control unit 11. The setting unit 23 sets the resolution of the external monitor 200 based on the value of the resolution received from the display control unit 11, while the setting unit 23 sets the resolution of the internal monitor 119 based on the value of the resolution stored in advance.

As described above, the display control function according to the present embodiment is provided by software implementation. Specifically, the information processing apparatus 100 executes an information processing program for implementing the display control function, whereby the display control function is implemented by the cooperation of the foregoing respective functional units.

The information processing program is stored and provided as a file of installable format or executable format in a storage medium 106 that is readable by the information processing apparatus 100 (computer) serving as an execution environment. The information processing program is configured as modules including the foregoing respective functional units. The CPU 101 reads the program from the storage medium 106 and executes the program to generate the respective functional units on the RAM 103. Note that the method for providing the information processing program is not limited thereto. For example, the information processing program may be stored in a device connected to the Internet or the like, and downloaded via the communication IF 112 through the network N. Specifically, in the information processing system 1000 according to the present embodiment, the information processing apparatus 100 transmits a request for the information processing program to the program providing apparatus 300. The information processing apparatus 100 thereby downloads the program from the program providing apparatus 300, and installs the program. If the information processing program is updated after the installation of the program, the information processing apparatus 100 downloads the program by the following method. For example, the program providing apparatus 300 notifies the information processing apparatus 100 of the update. The information processing apparatus 100 downloads the updated program from the program providing apparatus 300 and installs the program. At the time of update, the program itself may be downloaded. Differential elements constituting the program, such as libraries, may be downloaded. The information processing program may be provided as preinstalled in the ROM 102, the flash memory 104, or the like.

Hereinafter, processing (cooperative operation of the respective functional units) when executing the information processing program according to the present embodiment will be described with reference to sequence diagrams and flowcharts.

<Processing Performed when External Monitor 200 is Connected>

Figure 5:
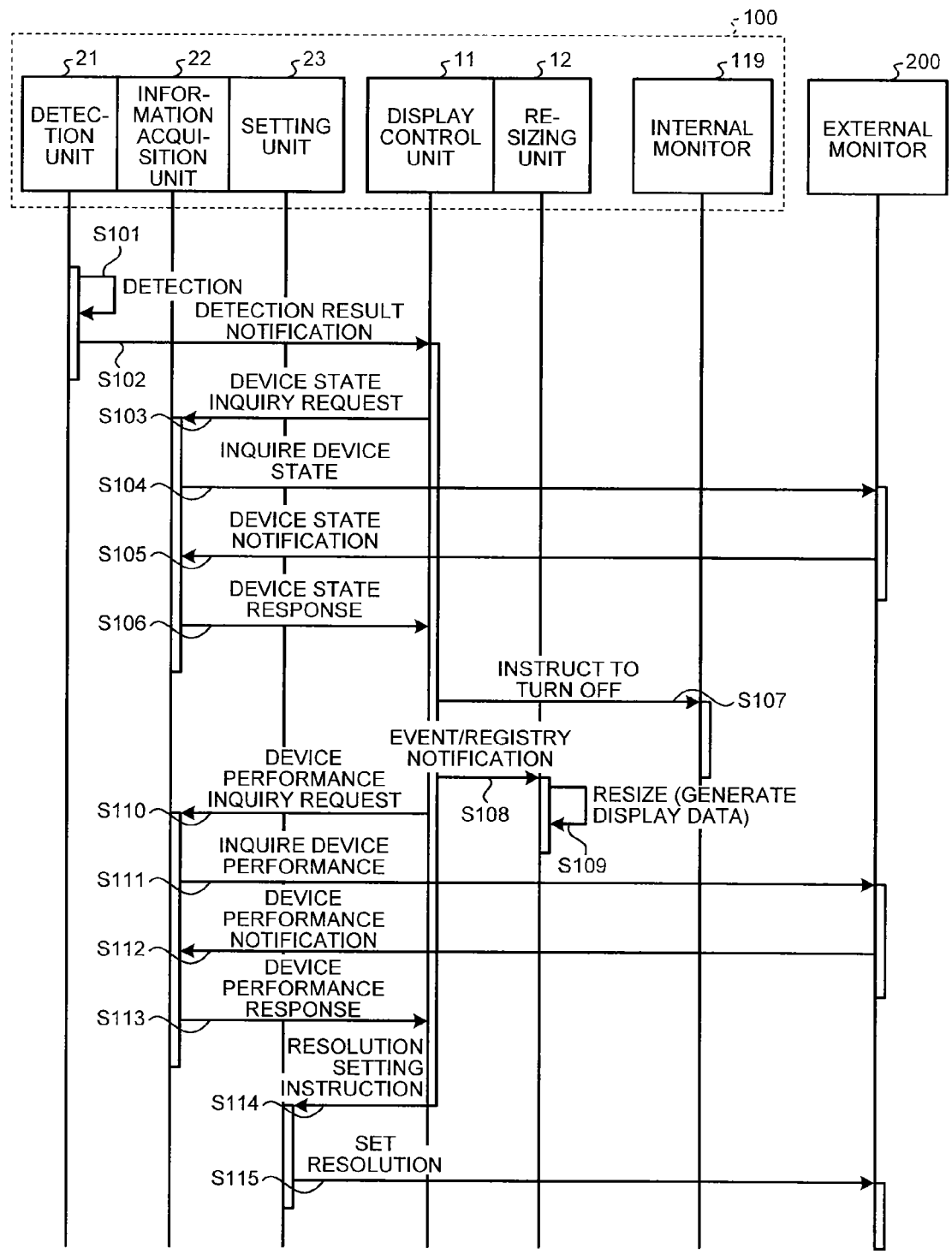
FIG. 5 is a sequence diagram illustrating a first example of processing procedure during display control according to the first embodiment.

FIG. 5 is a sequence diagram illustrating a first example of processing procedure during display control according to the present embodiment. When the external monitor 200 is connected, the information processing apparatus 100 according to the present embodiment performs the following processing by using the respective functional units.

As illustrated in FIG. 5, the detection unit 21 detects the state change of the information processing apparatus 100 (step S101), and issues an event notification about the detection result to the display control unit 11 (step S102).

In response, the display control unit 11 requests the information acquisition unit 22 to inquire the device state of the external monitor 200 (step S103). The information acquisition unit 22 inquires of the external monitor 200 about the device state via the external monitor IF 118 (step S104), and receives a device state notification from the external monitor 200 (step S105). The information acquisition unit 22 thereby obtains state information indicating the connection state of the external monitor 200. Based on the obtained state information, the information acquisition unit 22 sends back the device state of the external monitor 200 to the requesting display control unit 11 (step S106).

In response, the display control unit 11 switches the display monitor between the internal monitor 119 and the external monitor 200 based on the device state response.

Specifically, based on the received device state response, the display control unit 11 determines that the external monitor 200 is in a displayable state. The display control unit 11 instructs the internal monitor 119 to turn off its display screen (step S107). Next, the display control unit 11 instructs the resizing unit 12 by an event or registry notification to resize the display image according to the screen specifications of the external monitor 200 (step S108).

In response, the resizing unit 12 generates display data for resizing the display image having been displayed on the internal monitor 119 based on a magnification ratio calculated from the vertical ratio and horizontal ratio between the display area of the internal monitor 119 and the display area of the external monitor 200 (step S109). Here, the resizing unit 12 generates the display data by embedding the image data on the display image and setting the value of the magnification ratio as the parameter value of the image resizing processing according to the language specifications processable by the UI function of the external monitor 200.

If the external monitor 200 is determined to be in a displayable state, the display control unit 11 requests the information acquisition unit 22 to inquire the device performance of the external monitor 200 (step S110). The information acquisition unit 22 inquires of the external monitor 200 about the device performance via the external monitor IF 118 (step S111), and receives a device performance notification from the external monitor 200 (step S112). The information acquisition unit 22 thereby obtains performance information from the external monitor 200. Based on the obtained performance information, the information acquisition unit 22 sends back the device performance of the external monitor 200 to the requesting display control unit 11 (step S113).

In response, based on the value of the resolution included in the device performance response, the display control unit 11 instructs the setting unit 23 to set resolution according to the screen specifications of the external monitor 200 (step S114). The setting unit 23 sets the resolution of the external monitor 200 based on the value of the resolution received from the display control unit 11 (step S115).

As a result, in the external monitor 200 switched as the display monitor, the display data is interpreted by the UI function and the resized image data is drawn on the display screen.

As described above, by the display control function according to the present embodiment, the image having been displayed on the internal monitor 119 before switching is resized to a size suitable for the display area of the switched external monitor 200 and displayed according to appropriate resolution.

<Processing Performed when External Monitor 200 is not Connected>

Figure 6:
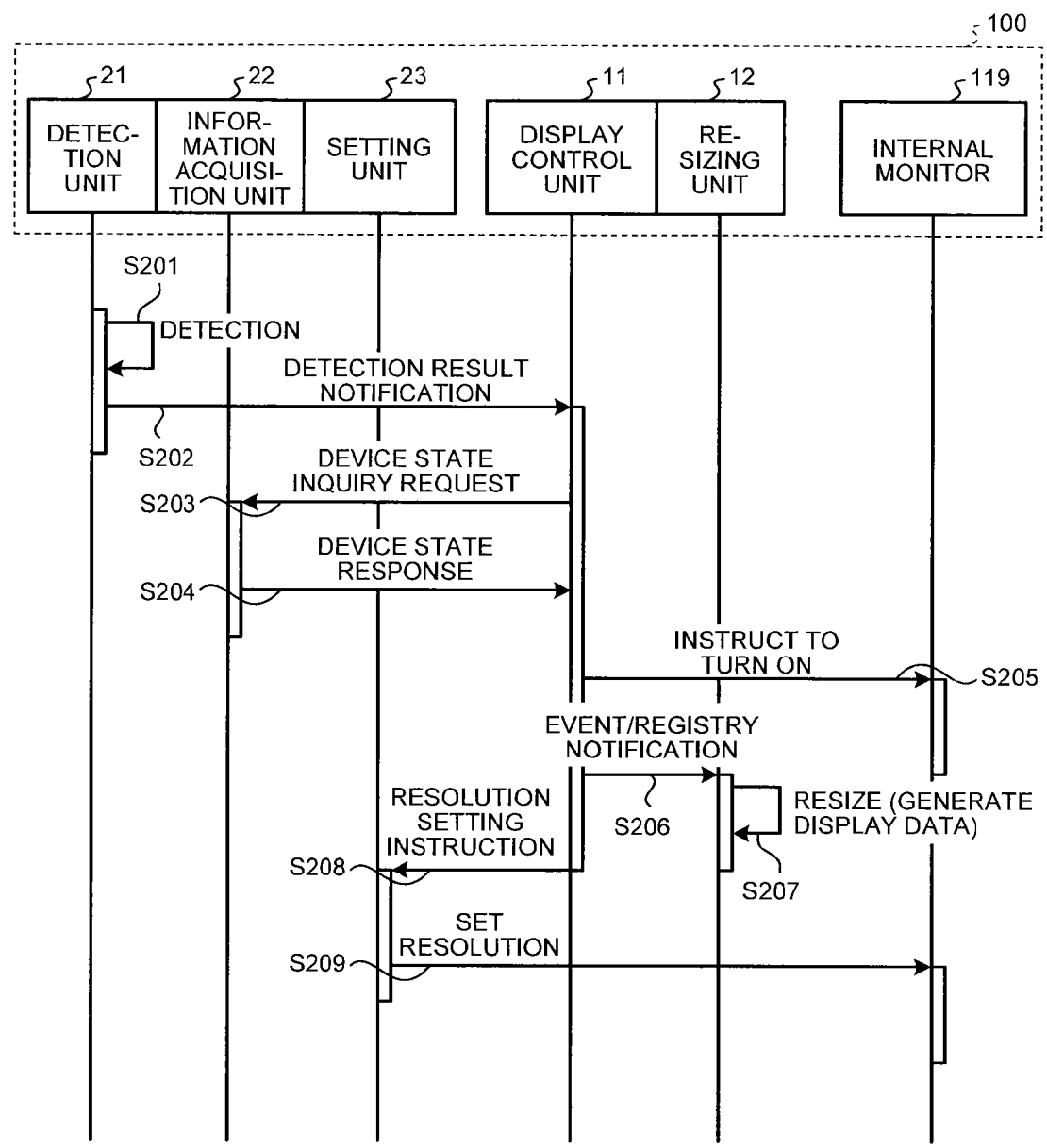
FIG. 6 is a sequence diagram illustrating a second example of processing procedure during display control according to the first embodiment.

FIG. 6 is a sequence diagram illustrating a second example of processing procedure during display control according to the present embodiment. When the external monitor 200 is detached, the information processing apparatus 100 according to the present embodiment performs the following processing by using the respective functional units.

As illustrated in FIG. 6, the detection unit 21 detects the state change of the information processing apparatus 100 (step S201), and issues an event notification about the detection result to the display control unit 11 (step S202).

In response, the display control unit 11 requests the information acquisition unit 22 to inquire the device state of the external monitor 200 (step S203). The information acquisition unit 22 receives from the external monitor IF 118 a device state notification indicating that the external monitor 200 is detached (in an unconnected state). The information acquisition unit 22 thereby obtains state information indicating the unconnected state of the external monitor 200. Based on the obtained state information, the information acquisition unit 22 sends back the device state of the external monitor 200 to the requesting display control unit 11 (step S204).

In response, the display control unit 11 switches the display monitor between the internal monitor 119 and the external monitor 200 based on the device state response.

Specifically, based on the received device state response, the display control unit 11 determines that the external monitor 200 is in a not-displayable state. The display control unit 11 instructs the internal monitor 119 to turn on its display screen (step S205). Next, the display control unit 11 instructs the resizing unit 12 by an event or registry notification to resize the display image according to the screen specifications of internal monitor 119 (step S206).

In response, the resizing unit 12 generates display data for resizing the display image having been displayed on the external monitor 200 based on a magnification ratio calculated from the vertical ratio and horizontal ratio between the display area of the internal monitor 119 and the display area of the external monitor 200 (step S207). Here, the resizing unit 12 generates the display data by embedding the image data on the display image and setting the value of the magnification ratio as the parameter value of the image resizing processing according to the language specifications processable by the UI function of the internal monitor 119.

If the external monitor 200 is determined to be in a not-displayable state, the display control unit 11 instructs the setting unit 23 to set resolution according to the screen specifications of the internal monitor 119 (step S208). The setting unit 23 sets the resolution of the internal monitor 119 based on the value of the resolution stored in advance (step S209).

As a result, in the internal monitor 119 switched as the display monitor, the display data is interpreted by the UI function and the resized display image is drawn on the display screen.

As described above, by the display control function according to the present embodiment, the image having been displayed on the external monitor 200 before switching is resized to a size suitable for the display area of the switched internal monitor 119 and displayed according to appropriate resolution.

Detailed Processing of Display Control

Figure 7:
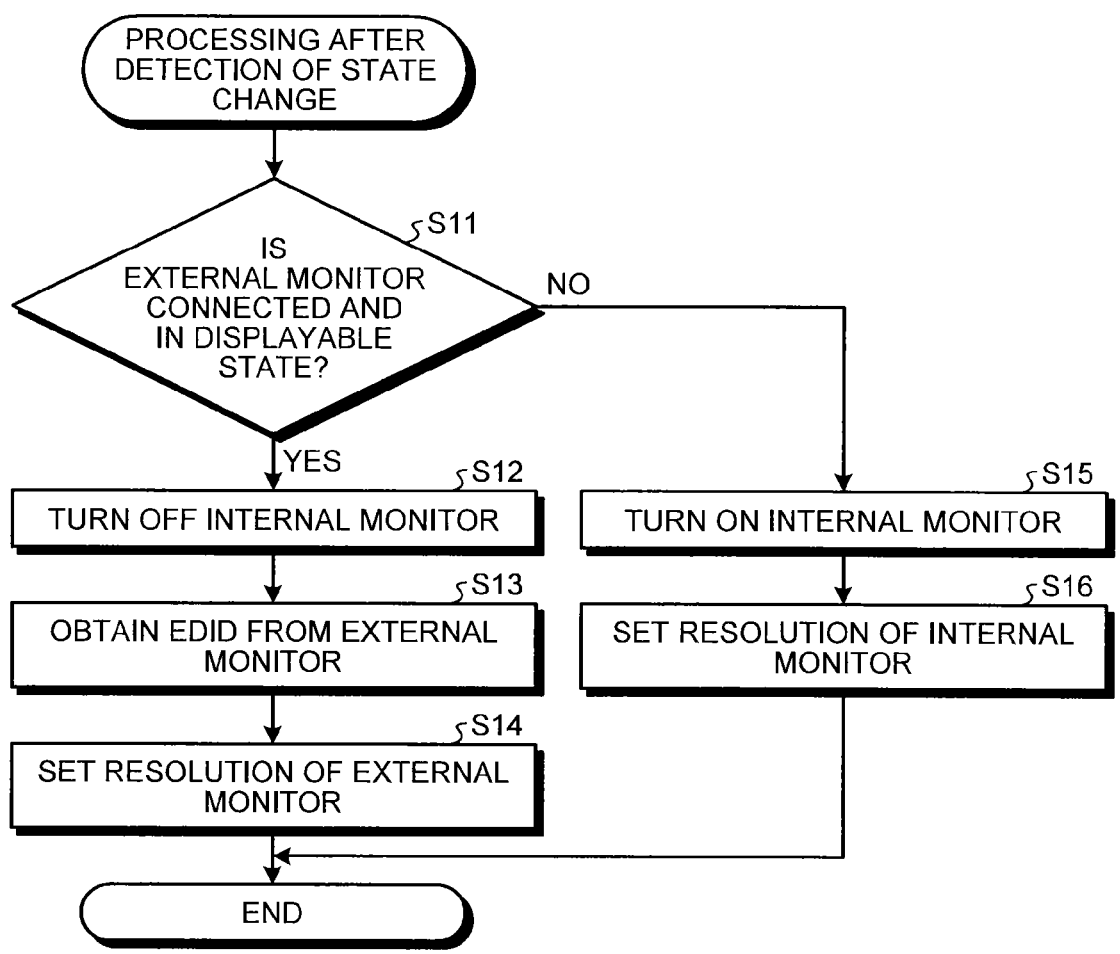
FIG. 7 is a flowchart illustrating a processing procedure example after detection of a state change according to the first embodiment.

FIG. 7 is a flowchart illustrating a processing procedure example after the detection of a state change according to the present embodiment. FIG. 7 illustrates an example of detailed processing for screen turn-on or screen turn-off control and resolution setting to be performed after the information processing apparatus 100 detects a state change.

As illustrated in FIG. 7, the information processing apparatus 100 determines whether the external monitor 200 is in a displayable state by using the display control unit 11 based on the device state response from the information acquisition unit 22 (step S11).

As a result, if the information processing apparatus 100 determines that the external monitor 200 is in a displayable state (step S11: YES), the information processing apparatus 100 turns off the internal monitor 119 by using the display control unit 11 (step S12). Next, the information processing apparatus 100 obtains EDID corresponding to the performance information from the external monitor 200 by using the information acquisition unit 22 (step S13). Next, the information processing apparatus 100 sets the resolution of the external monitor 200 by using the setting unit 23 based on the value of the resolution included in the obtained EDID (step S14).

On the other hand, if the information processing apparatus 100 determines that the external monitor 200 is not in a displayable state (step S11: NO), the information processing apparatus 100 turns on the internal monitor 119 by using the display control unit 11 (step S15). Next, the information processing apparatus 100 sets the resolution of the internal monitor 119 by using the setting unit 23 based on the value of the resolution stored in advance (step S16).

Figure 8A:
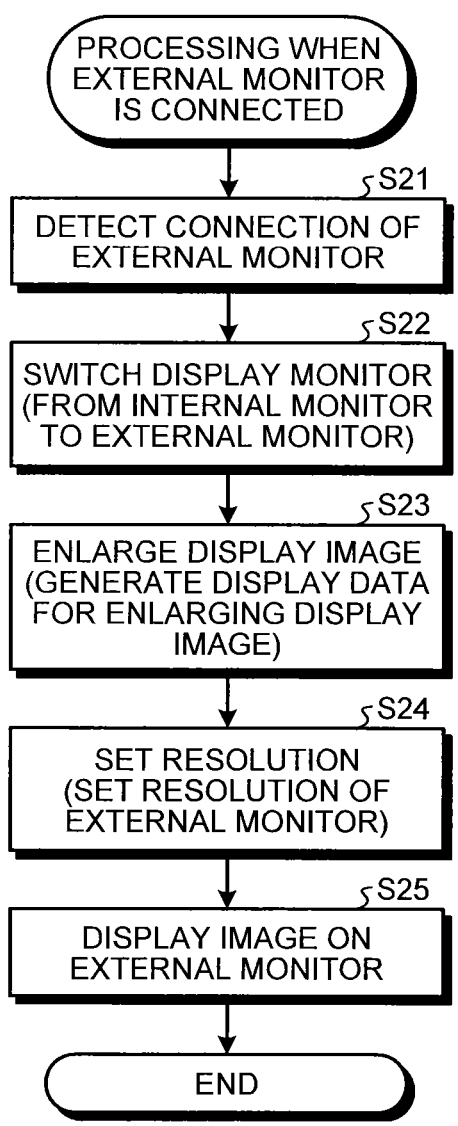
FIGS. 8A and 8B are flowcharts illustrating processing procedure examples when switching a display monitor according to the first embodiment.
Figure 8B:
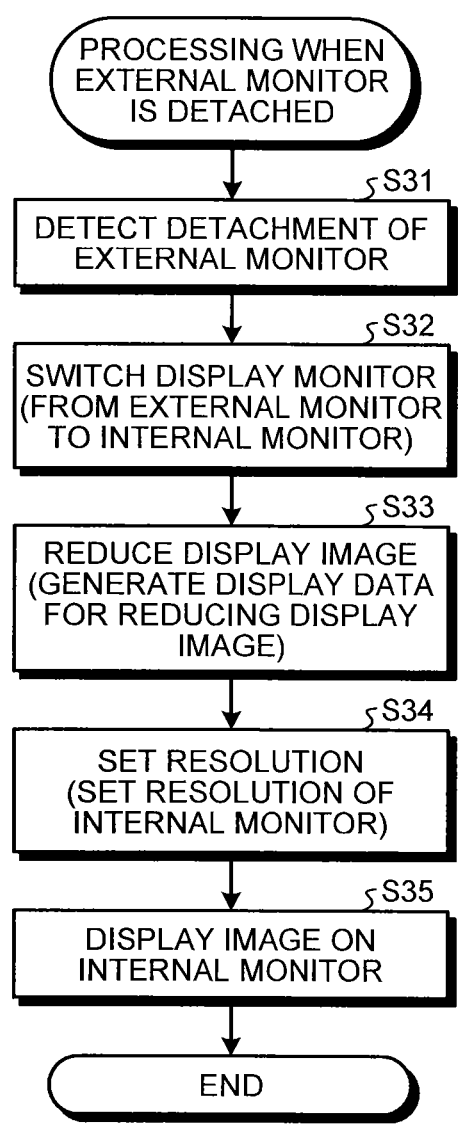

FIGS. 8A and 8B are flowcharts illustrating processing procedure examples when switching the display monitor according to the present embodiment. FIG. 8A illustrates an example of detailed processing for display control to be performed when the external monitor 200 is connected to the information processing apparatus 100. FIG. 8B illustrates an example of detailed processing for display control to be performed when the external monitor 200 is detached from the information processing apparatus 100. Note that FIGS. 8A and 8B illustrate examples of processing when the external monitor 200 has a display area larger than that of the internal monitor 119.

As illustrated in FIG. 8A, if the information processing apparatus 100 detects the connection of the external monitor 200 by using the detection unit 21 (step S21), the information processing apparatus 100 switches the display monitor by using the display control unit 11 (step S22). Here, the display control unit 11 switches the display monitor from the internal monitor 119 to the external monitor 200.

The information processing apparatus 100 enlarges the display image according to the display area of the external monitor 200 by using the resizing unit 12 (step S23). Here, the resizing unit 12 generates the display data by embedding the image data on the display image and setting the value of the enlargement ratio as the parameter value of the image resizing processing according to the language specifications processable by the UI function of the external monitor 200. Next, the information processing apparatus 100 sets the resolution according to the device performance of the external monitor 200 by using the setting unit 23 (step S24). Here, the setting unit 23 sets the resolution based on the value of the resolution included in the EDID of the external monitor 200.

As a result, the external monitor 200 draws an image enlarged to the size suitable for the display area on the display screen, and displays the image according to the appropriate resolution (step S25).

As illustrated in FIG. 8B, if the information processing apparatus 100 detects detachment of the external monitor 200 by using the detection unit 21 (step S31), the information processing apparatus 100 switches the display monitor by using the display control unit 11 (step S32). Here, the display control unit 11 switches the display monitor from the external monitor 200 to the internal monitor 119.

The information processing apparatus 100 reduces the display image according to the display area of the internal monitor 119 by using the resizing unit 12 (step S33). Here, the resizing unit 12 generates the display data by embedding the image data on the display image and setting the value of the reduction ratio as the parameter value of the image resizing processing according to the language specifications processable by the UI function of the internal monitor 119. Next, the information processing apparatus 100 sets the resolution according to the device performance of the internal monitor 119 by using the setting unit 23 (step S34). Here, the setting unit 23 sets the resolution based on the value of the resolution of the internal monitor 119 stored in advance.

As a result, the internal monitor 119 draws an image reduced to the size suitable for the display area on the display screen, and displays the image according to the appropriate resolution (step S35).

As described above, the information processing apparatus 100 according to the present embodiment detects the connection state of the external monitor 200. The information processing apparatus 100 switches the display monitor between the internal monitor 119 and the external monitor 200 based on the detected connection state, and controls the display screen according to the screen specifications of the display monitor thus switched. Here, the information processing apparatus 100 performs the resizing of the display image, the setting of the resolution of the display, etc.

The information processing apparatus 100 according to the present embodiment can thus provide an environment in which the display screen can be controlled according to the screen specifications of the display monitor when switching the display monitor between different display units. As a result, the information processing apparatus 100 according to the present embodiment can improve the visibility of the display screen.

In the foregoing embodiment, the display control has been described by using the switching of the display monitor based on the connection state of the external monitor 200 as an example. However, this is not restrictive. For example, display control may be performed by switching the display monitor based on a change of a use setting of the external monitor 200. In such a case, if the information processing apparatus 100 accepts a setting change for disabling the use of the external monitor 200 from a user's operation event, the information processing apparatus 100 switches the display monitor from the external monitor 200 to the internal monitor 119. Subsequently, if the information processing apparatus 100 accepts a setting change for enabling the use of the external monitor 200 from a user's operation event, the information processing apparatus 100 switches the display monitor from the internal monitor 119 to the external monitor 200.

In the foregoing embodiment, the target devices of the display control have been described by using display units (monitors) as an example. However, this is not restrictive. For example, the target devices of the display control may include a PC, smart phone, tablet terminal, mobile phone, and the like. In other words, the target devices of the display control may be any devices that can be connected to the information processing apparatus 100 and include a display unit (monitor).

The foregoing embodiment has dealt with an example of conference services where the conference materials stored in an information processing apparatus 100 are displayed on the internal monitors 119 or the external monitors 200. However, this is not restrictive. For example, an external device may be connected to an information processing apparatus 100, and the information processing apparatus 100 may receive display data for displaying material data from the external device and display the display data on the internal monitors 119 or the external monitors 200.

According to the present invention, there is provided the effect that the visibility of the display screen can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer program product comprising a non-transitory computer-readable medium containing an information processing program, the program causing a computer to perform:

detecting a connection state of an external monitor that is externally connected to the computer and is different from an internal monitor of the computer, the external monitor and the internal monitor being directly connected with the single computer via separate monitor interfaces of the computer, the monitor interfaces being separate from a communication interface of the computer that connects the computer to a network;

controlling, when switching a display monitor from the external monitor to the internal monitor based on the detected connection state indicating that the external monitor is disconnected from the computer, to resize a display image displayed on the display monitor according to a screen specification of the internal monitor, after automatically turning on the internal monitor; and controlling, when switching the display monitor from the internal monitor to the external monitor based on the detected connection state indicating that the external monitor is connected to the computer, to resize the display image displayed on the display monitor according to a screen specification of the external monitor, after automatically turning off the internal monitor, and when switching the display monitor from the internal monitor to the external monitor based on the detected connection state, the whole contents of a single screen of the internal monitor is switched to be displayed on a single screen of the external monitor, wherein the screen specification of the external monitor is requested from the external monitor, and when there is a failure to receive the screen specification of the external monitor from the external monitor, the screen specification of the external monitor is determined based on pre-stored magnification ratios of the screen specification of the internal monitor and respective screen specifications of external monitors connectable to the computer, wherein the computer is configured to establish bi-directional video communication with another computer via a network, and the program causes the computer to automatically switch the display monitor from the internal monitor to the external monitor, or from the external monitor to the internal monitor, after the video communication with the other computer has started, the other computer being connected to a different display monitor than the external monitor or the internal monitor, and the other computer controlling the display image displayed on the different display monitor independent of the detected connection state of the external monitor, wherein the display image that is controlled to be resized on the display monitor is an element within a display area of display monitor that corresponds to the bi-directional video communication, and image data of the display image is generated by the computer and transmitted to the other computer according to a predetermined format independently of the resizing of the display image displayed on the display monitor, and the computer receives image data from the other computer that is resized to become display data for displaying on the display monitor from among the internal monitor and the external monitor.

2. The computer program product according to claim 1, wherein the program causes the computer to further perform resizing the display image at a magnification ratio according to the screen specification of the display monitor, and the resizing includes calculating, before switching the display monitor based on the detected connection state, the magnification ratio of the display image based on a ratio in size between a display area before switching and a display area after switching to resize the display image at the calculated magnification ratio.

3. The computer program product according to claim 2, wherein the resizing includes generating display data for resizing the display image at the calculated magnification ratio according to a data format processable by a display screen drawing function of the internal display monitor or the external display monitor that is the display monitor thus switched.

4. The computer program product according to claim 3, wherein the resizing includes generating the display data by embedding therein display image data and setting a value of the magnification ratio as a parameter value used in image resizing processing according to the data format.

5. The computer program product according to claim 3, wherein when the display monitor is switched from the internal monitor to external monitor having a display area larger than that of the internal monitor, the resizing includes calculating an enlargement ratio of the display image based on the ratio in size between the display area of the internal monitor and the display area of the external monitor, and generating the display data for enlarging the display image at the calculated enlargement ratio according to the data format processable by the display screen drawing function of the external monitor.

6. The computer program product according to claim 3, wherein when the display monitor is switched from the external monitor to the internal monitor having a display area smaller than that of the external monitor, the resizing includes calculating a reduction ratio of the display image based on the ratio in size between the display area of the internal monitor and the display area of the external monitor, and generating the display data for reducing the display image at the calculated reduction ratio according to the data format processable by the display screen drawing function of the internal monitor.

7. An information processing method, implemented by a computer, comprising:

detecting a connection state of an external monitor that is externally connected to the computer and is different from an internal monitor of the computer, the external monitor and the internal monitor being directly connected with the single computer via separate monitor interfaces of the computer, the monitor interfaces being separate from a communication interface of the computer that connects the computer to a network;

controlling, when switching a display monitor from the external monitor to the internal monitor based on the detected connection state indicating that the external monitor is disconnected from the computer, a display image displayed on the display monitor according to a screen specification of the internal monitor, and automatically turning on the internal monitor; and controlling, when switching the display monitor from the internal monitor to the external monitor based on the detected connection state indicating that the external monitor is connected to the computer, the display image displayed on the display monitor according to a screen specification of the external monitor, and automatically turning off the internal monitor, and when switching the display monitor from the internal monitor to the external monitor based on the detected connection state, the whole contents of a single screen of the internal monitor is switched to be displayed on a single screen of the external monitor, wherein the screen specification of the external monitor is requested from the external monitor, and when there is a failure to receive the screen specification of the external monitor from the external monitor, the screen specification of the external monitor is determined based on pre-stored magnification ratios of the screen specification of the internal monitor and respective screen specifications of external monitors connectable to the computer, wherein the computer is configured to establish bi-directional video communication with another computer via a network, and the method includes automatically switching the display monitor from the internal monitor to the external monitor, or from the external monitor to the internal monitor, after the video communication with the other computer has started, the other computer being connected to a different display monitor than the external monitor or the internal monitor, and the other computer controlling the display image displayed on the different display monitor independent of the detected connection state of the external monitor, wherein the display image that is controlled to be resized on the display monitor is an element within a display area of display monitor that corresponds to the bi-directional video communication, and image data of the display image is generated by the computer and transmitted to the other computer according to a predetermined format independently of the resizing of the display image displayed on the display monitor, and the computer receives image data from the other computer that is resized to become display data for displaying on the display monitor from among the internal monitor and the external monitor.

8. An information processing apparatus comprising: circuitry configured to detect a connection state of an external monitor that is externally connected thereto and is different from an internal monitor thereof, the external monitor and the internal monitor being directly connected with the single information processing apparatus via separate monitor interfaces of the information processing apparatus, the monitor interfaces being separate from a communication interface of the information processing apparatus that connects the information processing apparatus to a network;

control, when switching a display monitor from the external monitor to the internal monitor based on the detected connection state indicating that the external monitor is disconnected from the information processing apparatus, a display image displayed on the display monitor according to a screen specification of the internal monitor, and automatically turn on the internal monitor; and control, when switching the display monitor from the internal monitor to the external monitor based on the detected connection state indicating that the external monitor is connected to the information processing apparatus, the display image displayed on the internal monitor according to a specification of the external monitor, and automatically turn off the internal monitor, and when switching the display monitor from the internal monitor to the external monitor based on the detected connection state, the whole contents of a single screen of the internal monitor is switched to be displayed on a single screen of the external monitor, wherein the circuitry requests the screen specification of the external monitor from the external monitor, and when there is a failure to receive the screen specification of the external monitor from the external monitor, the circuitry determines the screen specification of the external monitor based on pre-stored magnification ratios of the screen specification of the internal monitor and respective screen specifications of external monitors connectable to the computer, wherein the information processing apparatus is configured to establish bi-directional video communication with another information processing apparatus via a network, and the circuitry causes the information processing apparatus to automatically switch the display monitor from the internal monitor to the external monitor, or from the external monitor to the internal monitor, after the video communication with the other information processing apparatus has started, the other information processing apparatus being connected to a different display monitor than the external monitor or the internal monitor, and the other information processing apparatus controlling the display image displayed on the different display monitor independent of the detected connection state of the external monitor, wherein the display image that is controlled to be resized on the display monitor is an element within a display area of display monitor that corresponds to the bi-directional video communication, and image data of the display image is generated by the information processing apparatus and transmitted to the other information processing apparatus according to a predetermined format independently of the resizing of the display image displayed on the display monitor, and the information processing apparatus receives image data from the other information processing apparatus that is resized to become display data for displaying on the display monitor from among the internal monitor and the external monitor.

9. The computer program product according to claim 1, wherein when there is a failure to receive the screen specification of the external monitor from the external monitor, the screen specification of the external monitor is determined further based on a past switching pattern of the pre-stored magnification ratios used when previously switching the display monitor.

10. The information processing method according to claim 7, wherein when there is a failure to receive the screen specification of the external monitor from the external monitor, the screen specification of the external monitor is determined further based on a past switching pattern of the pre-stored magnification ratios used when previously switching the display monitor.

11. The information processing apparatus according to claim 8, wherein when there is a failure to receive the screen specification of the external monitor from the external monitor, the screen specification of the external monitor is determined further based on a past switching pattern of the pre-stored magnification ratios used when previously switching the display monitor.

* * * * *